United States Patent Office 3,011,646
Patented Dec. 5, 1961

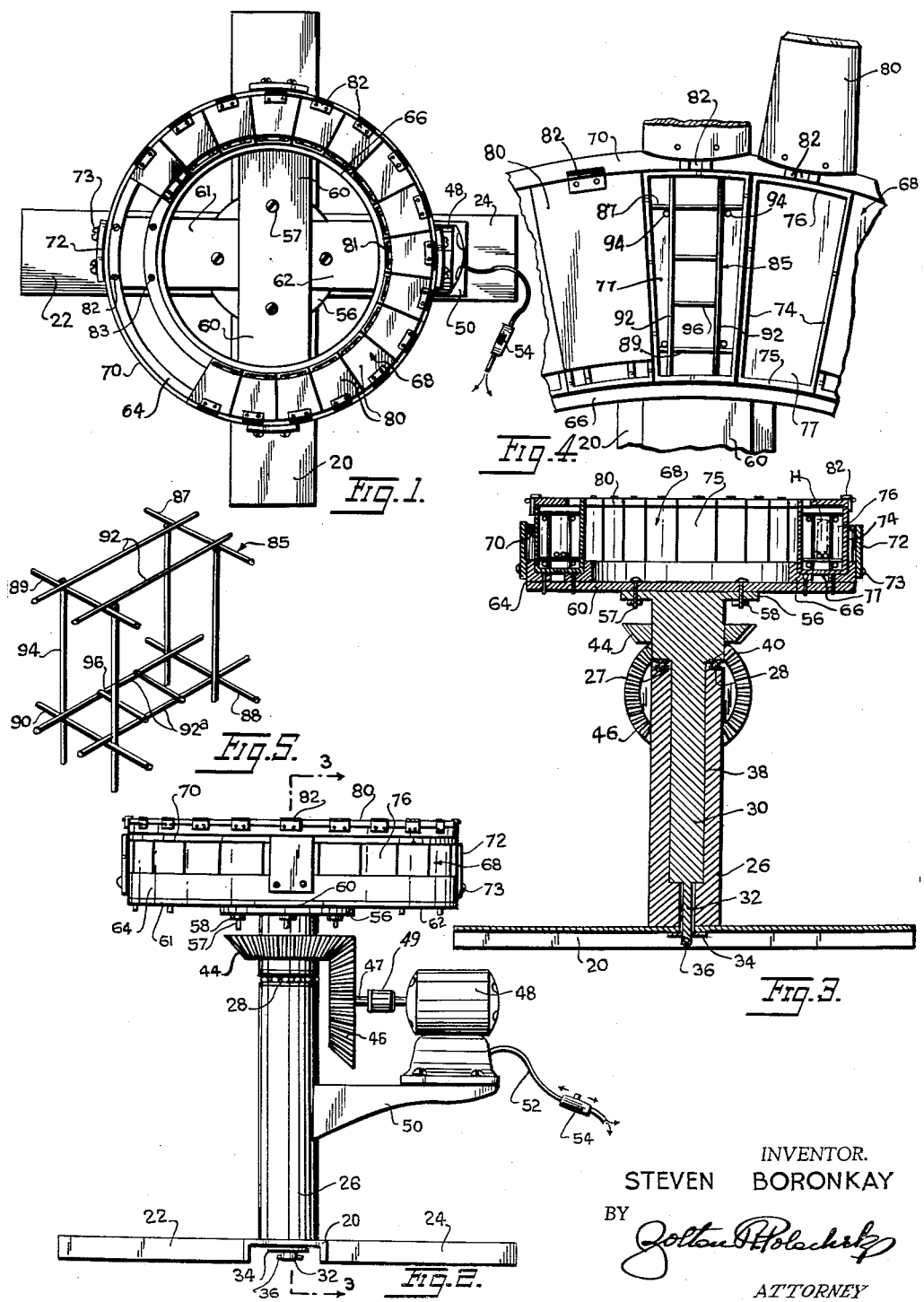
Dec. 5, 1961 — S. BORONKAY — 3,011,646
CENTRIFUGAL HONEY EXTRACTOR
Filed Jan. 8, 1959 — 3 Sheets-Sheet 1
INVENTOR.
STEVEN BORONKAY
ATTORNEY Dec. 5, 1961 S. BORONKAY 3,011,646
CENTRIFUGAL HONEY EXTRACTOR
Filed Jan. 8, 1959 3 Sheets-Sheet 2
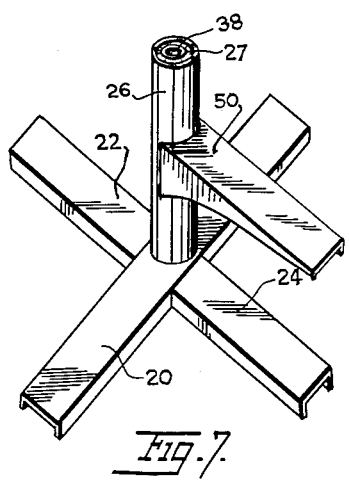
Fig. 7.
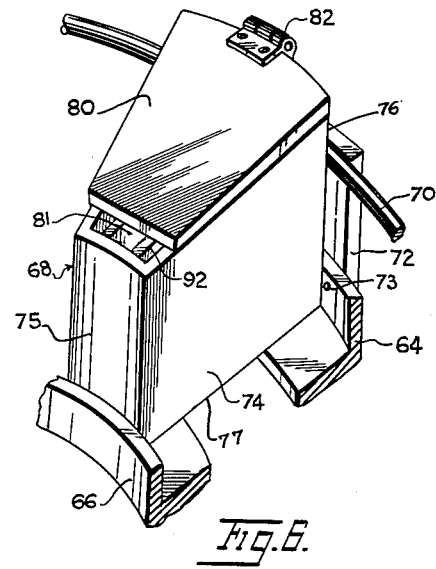
Fig. 6.
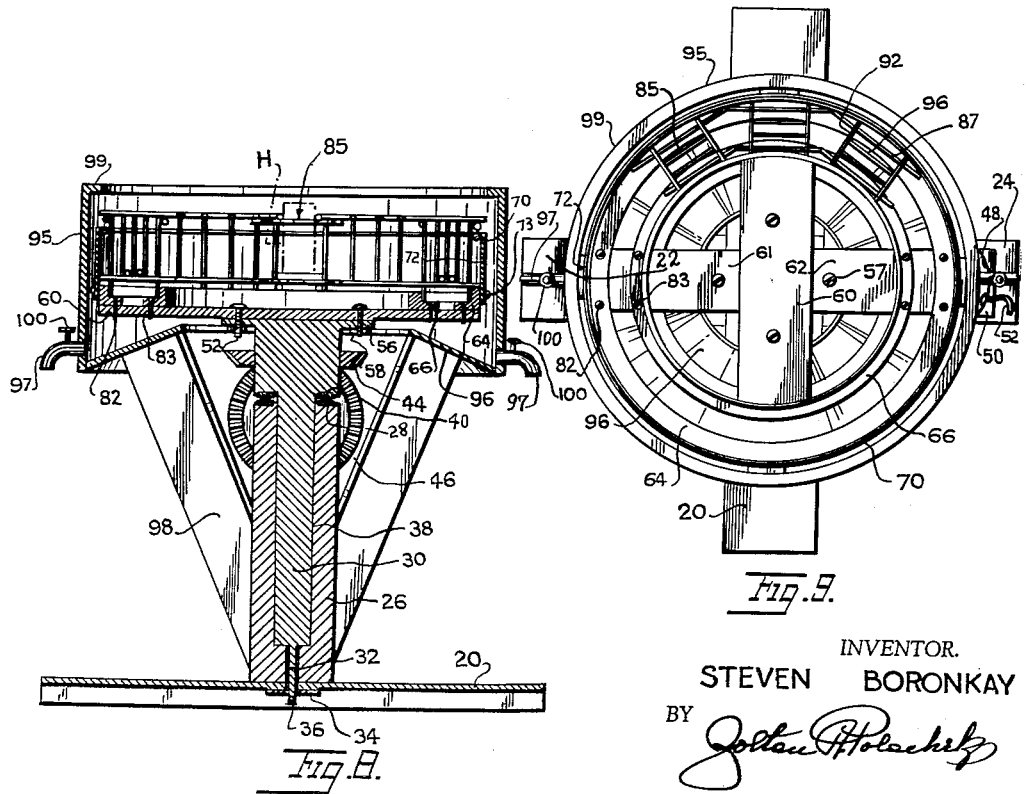
Fig. 8.
Fig. 9.
INVENTOR.
STEVEN BORONKAY
BY
ATTORNEY

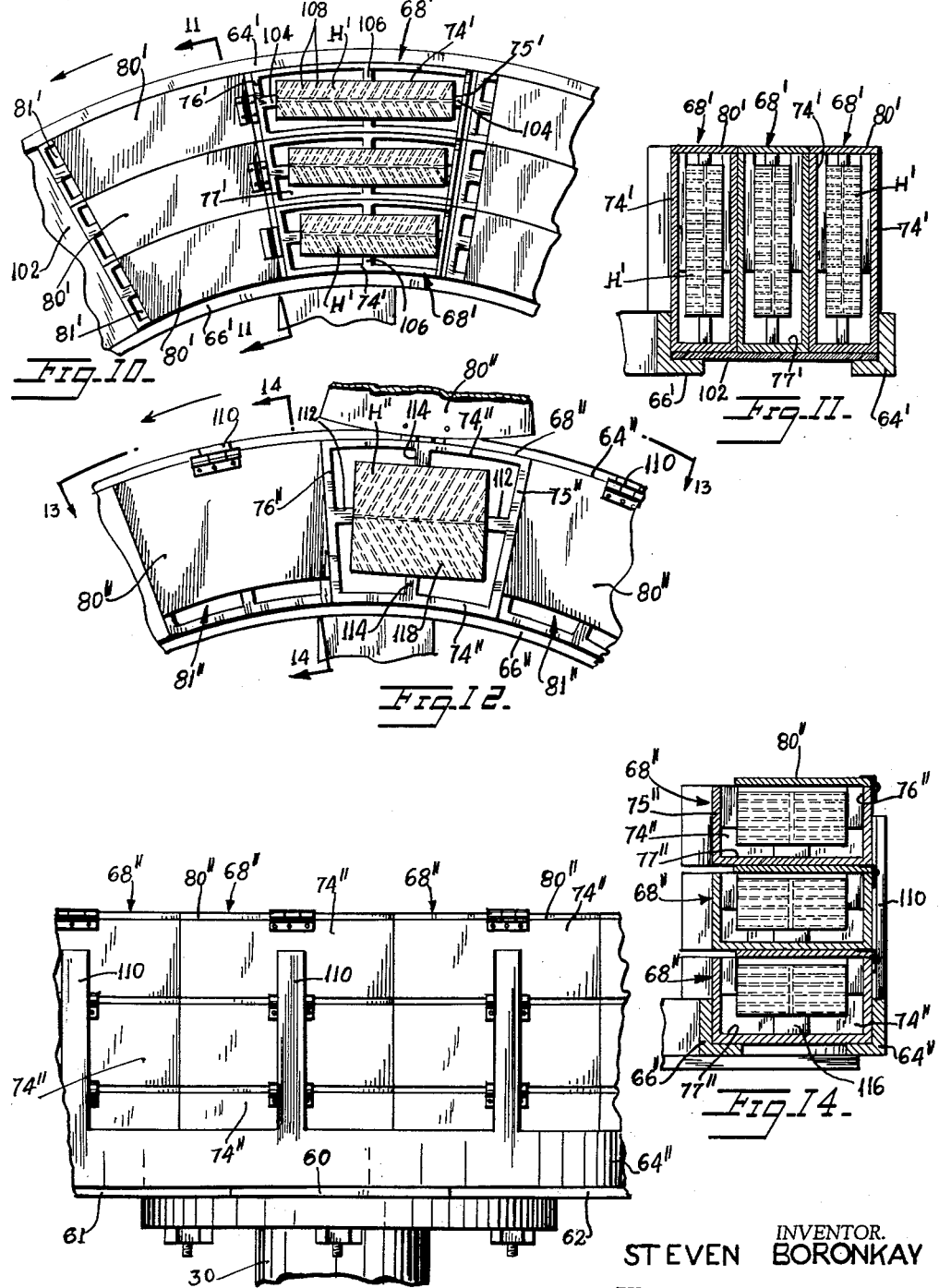

3,011,646
CENTRIFUGAL HONEY EXTRACTOR
Steven Boronkay, 10 Park Terrace, New York 34, N.Y.
Filed Jan. 8, 1959, Ser. No. 785,654
1 Claim. (Cl. 210—361)

This invention relates to honey extracting machines and is particularly concerned with an apparatus for removing honey from honeycombs through the exercise of centrifugal action upon the honeycombs.

A principal object of the invention is to provide a better and more efficient means for centrifugally emptying the honey from the honeycomb without crushing or injury thereto, and after said extraction to render the same honeycombs immediately available as comb foundations for the refilling thereof upon their return to the hive.

A further object is to dispense with the high degree of skill required of the workman for the efficient operation of the conventional types of honey extractors now known.

Another object is to furnish an improved form of honey extractor the operation of which is largely automatic in character and the mode of which may be successfully performed by an unskilled worker.

Another object is to reduce the number of parts heretofore thought necessary for the efficient operation of a honey extractor, thereby rendering the same more compact and resulting in economy of space and saving of material.

Another object is to provide means for guarding against breaking down and damaging of combs for further use in the hives.

A still further object is to provide means for discharging honey from the honeycombs into individual receptacles or containers rather than into a common receptacle as in conventional honey extractors, so that any pieces of comb or cap which may break off are confined to one receptacle and prevented from mingling with the entire mass of honey extracted. By use of individual receptacles or containers in the extractor it becomes possible to segregate honey from individual hives and even individual combs without mingling it with a common mass of honey. Thus, honey which may have accumulated in a certain hive by bees which gathered it from certain flowers, can be kept separate from honey of a different type and quality accumulated in another hive, while the extraction of all the honey can be made at the same time and in the same machine.

Another object is to provide a unique type of honeycomb carrier for supporting the honeycomb during extraction of the honey.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a top plan view of a honey extracting machine embodying the invention.

FIG. 2 is a side elevational view of the machine.

FIG. 3 is a longitudinal sectional view taken on line 3—3 of FIG. 2.

FIG. 4 is a top plan view on an enlarged scale of a portion of the machine showing details of construction of the individual receptacles or containers.

FIG. 5 is a perspective view of a honeycomb carrier frame employed in the machine.

FIG. 6 is a perspective view on an enlarged scale of a honeycomb container employed in the machine.

FIG. 7 is a perspective view of a stand and support employed in the machine.

FIG. 8 is a sectional view similar to FIG. 3 showing a machine structure embodying a modification of the invention, with a plurality of honeycomb carriers mounted thereon.

FIG. 9 is a top plan view of the machine of FIG. 8, with certain of the comb carriers removed to show details of the machine construction.

FIG. 10 is a fragmentary top plan view of a honey extracting machine showing a modified arrangement of honeycomb containers with honeycombs therein, parts being broken away.

FIG. 11 is a vertical sectional view taken on the plane of the line 11—11 of FIG. 10.

FIG. 12 is a fragmentray top plan view similar to FIG. 10 showing another modified arrangement of honeycomb containers with honeycombs therein, parts being broken away.

FIG. 13 is a plan view looking along the line 13—13 of FIG. 12.

FIG. 14 is a vertical sectional view taken along the plane of the line 14—14 of FIG. 12.

Referring to FIGS. 1–3, there is shown a machine having rotor and stator portions. The stator portion includes a horizontal stand formed by a channel bar 20 to which is welded two lateral channel bars 22 and 24 to form a crossed base structure. Welded to bar 20 is an upright tubular post 26. The post has an annular groove or channel 27 in the top end thereof providing a seat for a lower race for ball bearings 28.

The rotor portion includes a shaft 30 having a lower extension 32 which extends through bar 20 and is provided with a washer 34 and a pin 36 to retain the shaft rotatably in bore 38 in the post 26. The shaft has an enlarged upper portion forming a shoulder in which is formed a groove 40 providing a seat for an upper race for ball bearings 28. On the upper and wider portion of the shaft is fixed a bevel gear 44 which meshes with another bevel gear 46 carried on the drive shaft 47 of a motor 48, reduction gearing 49 being interposed between the motor and gear. The motor is mounted on a support arm 50 extending laterally from post 26. The motor is energized via cable 52 provided with a reversing switch 54 whereby the direction of the rotation of the rotor can be accomplished.

The top of shaft 30 is provided with an annular flange 56 to which is attached by bolts 57 and nuts 58 a crossbar or plate 60 and two laterally extending plates or bars 61, 62. The crossbars and lateral bars support two rings or rails 64 and 66. Ring 64 has the larger diameter. It is disposed at the outer ends of the bars 60, 61 and 62. It is L-shaped in cross section as shown best in FIGS. 3 and 6. The inner ring 66 is also L-shaped and is disposed concentrically within and spaced from ring 64. The rings provide two ledges disposed in opposing relation to form substantially rectangular base supports for receptacles or containers 68. A ring 70, round in cross section, is supported by brace bars 72 parallel with and above ring 64. This ring 70 provides an outer and upper support for the containers 68. Bars 72 are secured by screws 73 to the vertical wall of ring 64.

Each container, as best shown in FIGS. 4 and 6, has a wedge-shape body with two flaring side walls 74, an inner curved wall 75 and an outer narrow curved wall 76. The bottom wall 77 is integral with the walls 74–76. The top of each container 68 is open and is provided with a cover 80 whose length is somewhat less than the length of the top of the container to provide the small opening 81 at the inner end of the top of each container. A hinge 82 pivotally mounts the cover on the container. If desired, this hinge may be provided with a spring to bias the cover closed. The cover has the form of a truncated segment of a circle to conform with the wedge shape of the container. The several containers are not attached to the rails and are freely removable therefrom.

The containers are wedge-shaped so that a plurality thereof can be disposed in side-by-side juxtaposition between the rings, as shown in FIGS. 1–4. Normally the machine will contain a full complement of containers with no space between them. Several of the containers 68 are omitted from the drawing of FIG. 1 to show the rings 64 and 66 in more complete detail. The rings 64 and 66 are secured to the bars by screws 82 and 83.

Removably disposed within the containers are honeycomb carriers 85, constructed as best shown in FIGS. 4 and 5, of wire bars welded together. A single carrier is disposable within each container. Each carrier includes a pair of outer horizontal bars 87, 88 and a pair of inner horizontal bars 89, 90. The inner bars are shorter than the outer bars so that the carrier fits snugly within the wedge-shaped interior of the container 68. The bars 87, 89 are joined by a pair of parallel horizontally extending bars 92 and bars 88, 90 are joined by a similar pair of parallel bars 92ᵃ. The bars 92, 92ᵃ are all of equal length and are spaced inwardly from the ends of bars 87–90 so that stub lengths of the latter bars separate the bars 92, 92ᵃ from the sides of the container. Vertical rods or bars 94 join the upper and lower rectangular horizontal bar assemblies. Crossbars 96 are located on the bars 92ᵃ to provide a support for a honeycomb H as indicated in FIG. 3. Bars 92ᵃ are spaced from the bottom ends of the vertical bars 94 to support the honeycomb above the bottom wall 77 of the container interior. The carriers are thus frame structures forming an open cage in which the honeycomb can be supported in a position spaced away from the top, bottom, sides and ends of the container interior.

In operation of the device, a carrier 85 will be placed in each container 68 and the machine will be fully loaded with containers in a circular array on the rings 64, 66. A piece of honeycomb H with or without its natural cap will be placed in each carrier 85 resting on the crossbars 92ᵃ, 96. The cover 80 will be closed and the rotor will be rotated by the motor 48 via gears 44, 46 at a speed of about 300 revolutions per minute. It is desirable that the direction of rotation be reversed several times by means of switch 54. During the sudden starting and reversing intervals, the caps of the honeycombs will be loosened or broken from the combs but will be held in place on the combs by the carriers. The honey will be extracted centrifugally from the small honeycomb cells in a few minutes and will settle in the bottom of each container, leaving the dry comb and cap supported in the carrier above the extracted honey.

Due to air friction, the containers will be somewhat warm so that the honey will flow readily from the container which will be removed from the machine to be emptied. The honey will be removed after the carrier and comb are first removed. The comb will be in a condition to be placed back in the super of a hive for refilling by the bees. The honey will be in clean and pure state unmixed with honey in any other container. This makes it possible to segregate the honey of a single comb or groups of combs or an individual hive from the honey of other combs or hives, while permitting the honey to be extracted en masse from all combs simultaneously. If the rotor is about four feet in diameter it is possible to provide about eighty containers on the rotating wheel or rotor. The open structure of the wire bar carrier insures complete discharge of the honey without damage to the honeycombs.

If desired, another set of rings 64 and 66 can be provided on the rotor to double the number of containers which can be simultaneously rotated in the machine.

The machine of FIGS. 8 and 9 has been modified to the extent that the containers 68 are omitted and the individual carriers 85 are mounted on the rings 64, 66 and 70 in a juxtaposed circular array. Some carriers are omitted from the drawing of FIG. 9 to show details of the machine structure. A cylindrical collector having a wall 95 is provided for gathering the honey which will be discharged centrifugally from all the carriers simultaneously. This arrangement is not as advantageous as the arrangement of FIGS. 1–3 because the honey collects in a common mass or pool at the bottom of the collector in the V-shaped trough 96 formed on wall 95. Spigots 97 are provided at the bottom of the collector and have valve controlling handles 100, for drawing off the accumulated honey. The collector 95 is supported on angle bars 98 extending angularly upwards from the post 26. Other parts of the machine of FIGS. 8 and 9 are numbered the same as their corresponding parts in the machine of FIGS. 1–3. The machine of FIGS. 8 and 9 does have the advantage over conventional machines of similar character in the simplicity of its structure and the reduction of the number of parts employed to accomplish efficient extraction of the honey. The cylindrical collector 95 is open at its flanged top 99 and at its bottom to permit flow of air therethrough during the high speed of rotation of the rotor to increase the speed of extraction of the honey. The flow of air has been found desirable also because the honey is aerated during extraction which improves the flavor of the honey.

The opening 81 in the top of each container 68 also permits entry of air into the container during the extraction of the honey for improving its flavor and increasing the speed of extraction.

Referring now to FIGS. 10 and 11, in this modified form of rotor, the rails 64' and 66' are spaced further apart and an annular plate 102 extends around the rails and across the space therebetween and is supported by the horizontal portions of the rails as seen in FIG. 11. The containers 68' in this form are removably supported on the plate 102. Each container is substantially rectangular in cross section and in configuration with bottom wall 77', side walls 74', end walls 75' and 76' and is open at the top. The end walls 75' and 76' taper slightly. A hinged cover 80' covers the open top of the container, leaving an opening or space 81' at one end thereof. The container 68' is adapted to receive a similarly shaped honeycomb H' centrally thereof, the end walls being formed with central bars 104 therealong to space the honeycomb from the ends of the container and the side walls being formed with central bars 106 therealong to space the honeycomb from the side walls of the container. The cells 108 of the honeycombs radiate at an angle from the longitudinal centers of the honeycomb, opening outwardly of the sides of the honeycombs. The containers 68' are radially disposed in juxtaposed position as viewed in FIG. 10, with the longest container on the outer rail 64' and the shortest adjacent the inner rail 66' and with the other container in the middle. The end walls of the containers are in tapered alignment.

In operation, when the rotor is driven around by the motor, the centrifugal force created thereby flings the honey out of the cells 108 of the honeycombs H' through the sides thereof depositing the honey on the bottom walls of the containers. The containers are readily removed for extraction of the honey.

Another modified form of rotor portion of the machine is shown in FIGS. 12 to 14, inclusive, wherein the containers 68" are superimposed upon each other in stacks of threes and supported on the rails 64" and 66", the containers being sufficiently long to span the space between the rails. The containers are each substantially rectangular and box-like in shape, with side walls 74", end walls 75" and 76" and bottom wall 77" and open at the top. A cover 80" is hinged to one of the side walls and covers the open top, leaving an opening or space 81" along the opposite side of the container. The outer rail 64" is formed with upstanding arms 110 spaced therealong and the outer side walls of the containers are placed against said arms whereby the containers are held against falling off upon turning of the rotor.

The containers 68" are adapted to receive the honeycombs H" spaced from the walls thereof by means of central spacer bars 112 on the end walls 75" and 76", spacer bars 114 on the side walls 74", and spacer bars 116 on the bottom walls 77". Upon rotation of the rotor, centrifugal force will sling the honey out through the angularly disposed cells 118 of the honeycombs to the side walls where it will fall by gravity to the bottom walls of the containers. The containers are readily removed for extracting the honey therefrom.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new and desire to secure by United States Letters Patent is:

A honey extraction machine, comprising a support rotatable in a horizontal plane, a plurality of containers removably mounted on said support, each of said containers having two flaring vertical side walls, an inner narrow partially cylindrical wall, an outer partially cylindrical wall concentric with the inner wall, a flat horizontal bottom wall, the side, inner, outer and bottom walls being joined together to form a closed wedge-shaped body with open top, a cover hingedly mounted on the outer wall and having a length shorter than the bottom wall to provide a partial closure with an air vent at the top of the container when the cover is closed on the side and outer walls; and a carrier for a honeycomb removably disposed in each of the containers, said carrier comprising a pair of outer horizontal bars extending in one direction, a pair of inner horizontal bars extending in the same direction, the outer bars being longer than the inner bars, a pair of parallel horizontal bars joining one bar of the outer horizontal bars and one bar of the inner horizontal bars and extending perpendicularly to the first-named horizontal bars, a pair of parallel horizontal bars joining the other one of the outer horizontal bars and the other one of the inner horizontal bars, said latter pair of joining bars disposed in the same direction as the first pair of joining bars, the joining bars being of equal length and spaced inwardly from the ends of the pairs of horizontal bars leaving stub lengths radiating from all sides, spaced vertical bars joining the upper and lower rectangular horizontal bar assemblies, and bars extending across the lower joining bars providing a support for a honeycomb in a vertical plane, the lower joining bars being spaced upwardly from the bottom ends of the vertical bars to provide a space for collecting honey on the bottom of the container underneath the honeycomb.

References Cited in the file of this patent

UNITED STATES PATENTS

| | | |
|---|---|---|
| 221,806 | Goubert | Nov. 18, 1879 |
| 224,654 | Cole | Feb. 17, 1880 |
| 1,334,585 | Baird | Mar. 23, 1920 |
| 1,491,868 | Kunkel | Apr. 29, 1924 |
| 1,657,717 | Hodgson | Jan. 31, 1928 |
| 1,708,721 | Evans | Apr. 9, 1929 |
| 1,791,604 | Root | Feb. 10, 1931 |
| 1,840,693 | Brooks | Jan. 12, 1932 |
| 2,059,461 | Johnson | Nov. 3, 1936 |
| 2,203,438 | Maendel | June 4, 1940 |
| 2,732,945 | Mandrapa | Jan. 31, 1956 |